United States Patent
Suzuki et al.

(10) Patent No.: US 7,335,019 B2
(45) Date of Patent: Feb. 26, 2008

(54) FIRING CONTAINER FOR SILICON NITRIDE CERAMICS

(75) Inventors: Keiichiro Suzuki, Yokohama (JP); Masakatsu Fujisaki, Yokohama (JP); Yuji Shimao, Yokohama (JP); Satoshi Ogaki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 567 days.

(21) Appl. No.: 10/901,158

(22) Filed: Jul. 29, 2004

(65) Prior Publication Data

US 2005/0056974 A1   Mar. 17, 2005

(30) Foreign Application Priority Data

Aug. 1, 2003   (JP)   ............... 2003-285226

(51) Int. Cl.
*F27B 5/00*   (2006.01)
(52) U.S. Cl. .............. 432/200; 432/247; 432/249; 264/683
(58) Field of Classification Search ........ 432/156, 432/161, 162, 176, 192, 200–203, 247, 249, 432/258; 264/605, 630, 683
See application file for complete search history.

(56) References Cited

U.S. PATENT DOCUMENTS

| | | | | |
|---|---|---|---|---|
| 2,039,429 | A | * | 5/1936 | Lydon ................. 432/176 |
| 4,202,661 | A | * | 5/1980 | Lazaridis et al. .............. 432/8 |
| 4,306,859 | A | | 12/1981 | Jarmell et al. |
| 4,789,333 | A | | 12/1988 | Hemsath |
| 4,927,577 | A | * | 5/1990 | Ohtaka et al. .............. 264/630 |
| 5,256,347 | A | * | 10/1993 | Miyahara .................. 264/40.6 |
| 5,316,710 | A | * | 5/1994 | Tasaki et al. ............... 264/630 |
| 5,378,144 | A | * | 1/1995 | Cress ........................ 432/120 |
| 5,725,829 | A | * | 3/1998 | Miyahara et al. ........... 264/630 |
| 5,772,429 | A | * | 6/1998 | Fehrenbach et al. ........ 432/162 |
| 6,565,797 | B2 | | 5/2003 | Miyakawa et al. |
| 6,593,261 | B2 | | 7/2003 | Shinohara et al. |
| 2003/0047829 | A1 | | 3/2003 | Gadkaree |
| 2005/0056974 | A1 | | 3/2005 | Suzuki et al. |

FOREIGN PATENT DOCUMENTS

JP   58-38387   8/1983

(Continued)

OTHER PUBLICATIONS

U.S. Appl. No. 11/287,461, filed Nov. 28, 2005, Shinohara, et al.

(Continued)

*Primary Examiner*—Gregory Wilson
(74) *Attorney, Agent, or Firm*—Oblon, Spivak, McClelland, Maier & Neustadt, P.C.

(57) ABSTRACT

A firing container for silicon nitride ceramics, which is a hermetically sealed container having a gas inlet and a gas outlet, characterized in that the interior of the hermetically sealed container is partitioned by a gas supply chamber partition plate into a gas supply chamber communicating with the gas inlet, and a firing chamber to accommodate an object to be heat-treated and communicating with the gas outlet, and the gas supply chamber partition plate has vent holes selectively formed in the vicinity of its periphery.

9 Claims, 2 Drawing Sheets

FOREIGN PATENT DOCUMENTS

| | | |
|---|---|---|
| JP | 61-3304 | 1/1986 |
| JP | 5-270926 | 10/1993 |
| JP | 11-79850 | 3/1999 |
| JP | 2001-141373 | 5/2001 |
| JP | 2001-146463 | 5/2001 |

OTHER PUBLICATIONS

U.S. Appl. No. 11/240,509, filed Oct. 3, 2005, Shinohara, et al.

\* cited by examiner

FIRING CONTAINER FOR SILICON NITRIDE CERAMICS

The present invention relates to a firing container which accommodates a green body comprising metal silicon particles and/or silicon nitride particles, particularly a honeycomb green body, in a process for producing a silicon nitride body by heat treatment such as nitriding and firing of such a green body.

In firing of non-oxide ceramics such as silicon nitride, the product quality is influenced by the atmosphere, and it is accordingly important to control the gas flow in the firing container to prevent decomposition or evaporation of the object to be treated. In a case where metal silicon is reacted with nitrogen gas to form silicon nitride (hereinafter referred to as nitriding), it is particularly important to control the gas flow in the firing container. Further, a honeycomb green body comprising porous thin walls, has also a large size, whereby a deformed or otherwise defective product is likely to be formed. Accordingly, in heat treatment of a silicon nitride honeycomb green body (particularly when it contains metal silicon particles), control of the gas flow in the firing container presents a serious influence over the quality of the product. The firing container may sometimes called a sagger.

Heretofore, as a firing container for a silicon nitride green body, one having a feature in the material (JP-B-58-38387, JP-B-61-3304) or a method wherein a honeycomb green body is embedded in a powder and set in a ceramic container (JP-A-11-79850) has, for example, been proposed, but there is no disclosure with respect to control of the gas flow in the firing container.

As a method for controlling the gas flow in a firing container, a method has been proposed in which in order to facilitate replacement of the ambient atmosphere of a green body such as an alumina substrate or a ferrite element, one to ten through-holes per 1 $cm^2$ will be formed in a loading platform for a ceramic green body, and the diameters of such through-holes are controlled to be from 1 to 5 mm, although this method is not directly intended to fire a silicon nitride green body (JP-A-5-270926).

Likewise, it has been proposed to install in a hermetically sealed container, upper and lower covers having vent holes formed at positions mutually different in an up-and-down direction of a green body, for a firing jig which is capable of preventing non-uniformity of decomposition of a binder or contamination due to retention of a decomposed gas in the jig, even in a case where a large quantity of ceramics is fired (JP-A-2001-141373, JP-A-2001-146463).

However, such a firing container is a firing container suitable for firing a small sized component as shown in FIG. 3(a) in JP-A-2001-141373, and it may not suitably be applicable as it is to firing of a large sized columnar body such as a silicon nitride green body, particularly a honeycomb green body.

In any case, a firing container for silicon nitride ceramics has not yet been proposed which is capable of controlling the gas flow in the firing container and capable of nitriding and firing a silicon nitride green body, particularly a honeycomb green body comprising metal silicon particles and/or silicon nitride particles without deformation or defects in good dimensional precision with high efficiency and high product quality.

It is an object of the present invention to provide a firing container for silicon nitride ceramics, which is capable of heat treating, i.e. nitriding or firing, a silicon nitride green body, particularly a honeycomb green body comprising metal silicon particles and/or silicon nitride particles, in good dimensional precision without deformation or defects, with high efficiency and high product quality.

The present invention provides a firing container for silicon nitride ceramics, which is a hermetically sealed container having a gas inlet and a gas outlet, characterized in that the interior of the hermetically sealed container is partitioned by a gas supply chamber partition plate into a gas supply chamber communicating with the gas inlet, and a firing chamber to accommodate an object to be heat-treated and communicating with the gas outlet, and the gas supply chamber partition plate has vent holes selectively formed in the vicinity of its periphery.

In the firing container provided by the present invention, a gas introduced from the gas inlet will pass through the vent holes selectively formed at the peripheral portion of the partition plate and will be introduced into the firing chamber in which a silicon nitride green body is to be placed. The gas introduced into the firing chamber will be connected while being preliminary heated along the inner wall surface of the firing container, and it will not directly be contacted with the silicon nitride green body in a state where the preheating is inadequate, and it will be in contact with the silicon nitride green body for the first time in a stage where it is heated to a prescribed temperature.

Details of this convection mechanism are not clear. However, it is considered that the gas rectified in the gas supply chamber will flow along the ceiling surface of the container, so that while being heated, it will pass through the vent holes of the partition plate and be introduced into the firing chamber. The gas introduced into the firing chamber is not yet adequately heated, and the gas flow rate will be increased as it passes through the vent holes, whereby it will reach to the bottom of the container without being directly contacted with the silicon nitride green body, whereupon while being heated to the prescribed temperature, the gas is connected in the firing chamber, whereupon the gas will be uniformly contacted with the silicon nitride green body.

Thus, it is possible to prevent a serious problem such as a trouble caused by introducing an inadequately preheated gas into a heat treatment furnace such as a firing furnace and contacting it directly with a silicon nitride green body, for example, lowering of the temperature of the silicon nitride green body, or initiation of nitriding or sintering locally to cause defects such as cracking or bulging, thereby to increase non-uniformity of the product quality. Namely, it is possible to substantially reduce the rejection rate, to improve the energy budget since it is unnecessary to preheat the gas to be introduced and to realize high productivity and low cost.

In a case of a silicon nitride green body containing metal silicon particles, nitriding will be involved which is difficult to control. However, by using the sintering container provided by the present invention, the temperature distribution will be uniform, and yet it will be easy to control $N_2$ gas during nitriding, whereby defective products caused by nitriding can be remarkably reduced. Such an effect is particularly remarkable with a batch system heat treating furnace wherein a large quantity will be treated all at once.

According to the present invention, it is possible to provide a firing container for silicon nitride ceramics, which is capable of firing a silicon nitride green body, particularly a honeycomb green body comprising metal silicon particles and/or silicon nitride particles without deformation or defects and yet in good dimensional precision and with high efficiency and high product quality.

The firing container for silicon nitride ceramics of the present invention (hereinafter referred to as the present firing container) is a hermetically sealed container having a gas inlet and a gas outlet.

Figure 1:
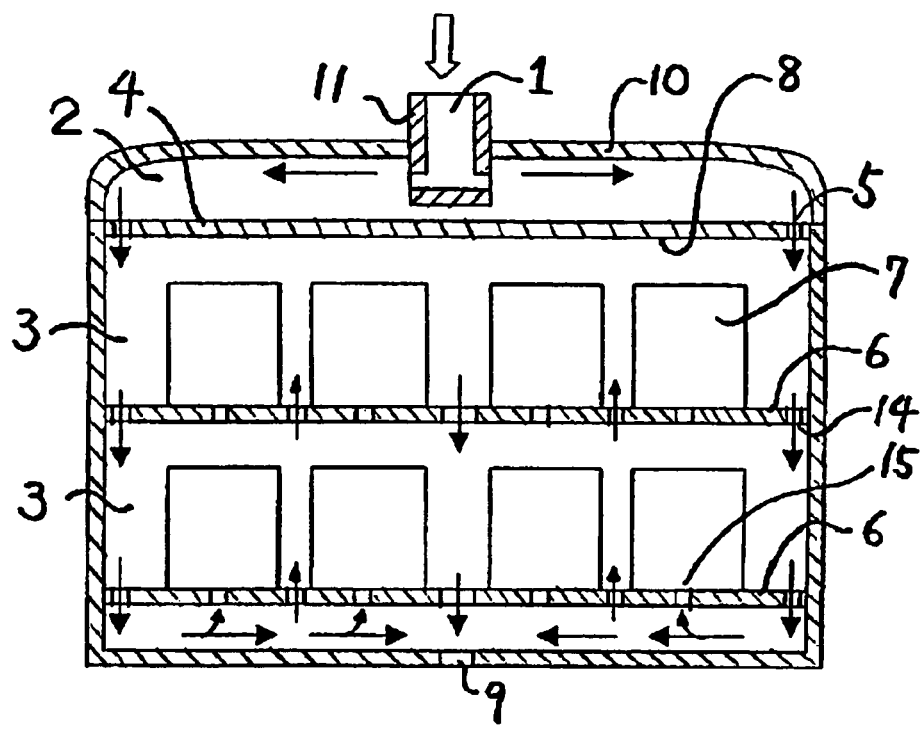
FIG. 1 is a vertical cross-sectional view of one embodiment of the present firing container.

In the drawings, reference numeral 1 represents a gas inlet, 2 a gas supply chamber, 3 a firing chamber, 4 a gas supply chamber partition plate, 5 a gas supply chamber peripheral hole, 6 a firing chamber partition plate, 7 a silicon nitride green body, 8 an inner surface, 9 a gas outlet, 10 an upper cover, 11 a pipe, 13 a partition wall, 14 a firing chamber peripheral hole, 15 a firing chamber central hole, and 20 the present firing container.

Now, the present firing container 20 will be described with reference to the drawings. FIG. 1 is a vertical cross-sectional view of the present firing container 20. It should be mentioned that FIG. 1 is an embodiment of the firing container 20, and the present invention is by no means restricted to FIG. 1. In the FIG. , the arrows schematically show an embodiment of the gas flow, but the gas flow varies depending upon the gas flow rate, or the number or the manner of disposition of the objects to be heat-treated and is not limited thereto. The same applies to FIG. 4.

In FIG. 1, reference numeral 1 represents a gas inlet, 2 a gas supply chamber, 3 a firing chamber, 4 a partition plate dividing the gas supply chamber 2 and the firing chamber 3 (hereinafter referred to as a gas supply chamber partition plate), 5 a vent hole formed in the vicinity of the periphery of the gas supply chamber partition plate 4 (hereinafter referred to as a gas supply chamber peripheral hole), 6 a partition plate dividing the interior of the firing chamber 3 (hereinafter referred to as a firing chamber partition plate), 7 a silicon nitride green body as an object to be heat-treated, 8 an inner surface of the present container, 9 a gas outlet, 10 an upper cover, and 11 a pipe inserted into the gas inlet 1.

The present firing container 20 has a gas inlet 1. With respect to the gas inlet 1, there is no particular restriction with respect to the shape, the number, the position, etc. so long as it is capable of introducing an atmosphere gas for heat treatment such as nitriding or firing. However, it is preferred to form a through-hole in the vicinity of the center of the upper cover 10 of the container, whereby the gas flow will be symmetrical. If necessary, carbon fibers, ceramic fibers or porous ceramic material may be plugged in the through-hole while maintaining air permeability. Further, a pipe 11 or the like may be inserted in the through-hole in order to rectify the gas flow, whereby the gas to be introduced from the gas inlet 1, will be rectified, such being desirable. Such a pipe 11 is preferably a cylindrical pipe having one end opened and the other end closed, and on the side surface of the closed end, holes are formed as spaced circumferentially, so that the gas will be introduced radially.

The present firing container 20 is characterized in that the interior is partitioned by the gas supply chamber partition plate 4 into the gas supply chamber 2 communicating with the gas outlet 1 and the firing chamber 3 communicating with the gas outlet 9, and the gas supply chamber partition plate 4 has the gas supply chamber peripheral holes 5 selectively formed in the vicinity of the periphery. Further, the gas supply chamber 2 is a space for controlling the gas flow and for preheating the gas. As the material for the gas supply chamber partition plate 4, a carbon plate may be processed to have holes and then a slurry containing silicon nitride particles and/or metal silicon particles may be coated and dried, or a silicon nitride plate material may be provided with holes.

As another material, it is preferred to use a silicon carbide material, whereby the heat resistance will be high and the durability will be high with little deformation even by repeated use. As the starting material particles for such a silicon carbide material, it is preferred to use silicon carbide particles of high purity from the viewpoint of control of the atmosphere. A crystallized silicon carbide product or a sintered product obtained by sintering by means of a sintering aid, using high purity silicon carbide particles as the starting material, may, for example, be mentioned as a preferred silicon carbide material. Further, when a silicon carbide material is to be used, a slurry containing silicon nitride particles and/or metal silicon particles may be coated and dried on its surface.

In the present invention, the gas supply chamber partition plate 4 is provided with a plurality of gas supply chamber peripheral holes 5 to introduce an atmospheric gas. Such gas supply chamber peripheral holes 5 are disposed as distributed in the vicinity of the periphery of the partition plate 4. By such disposition, the atmospheric gas passed through the gas supply chamber peripheral holes 5 will reach the lower portion of the container without being directly in contact with the silicon nitride green body 7, while being heated, and it will be circulated in the firing chamber 3 and then uniformly supplied to the silicon nitride green body 7.

Figure 2:
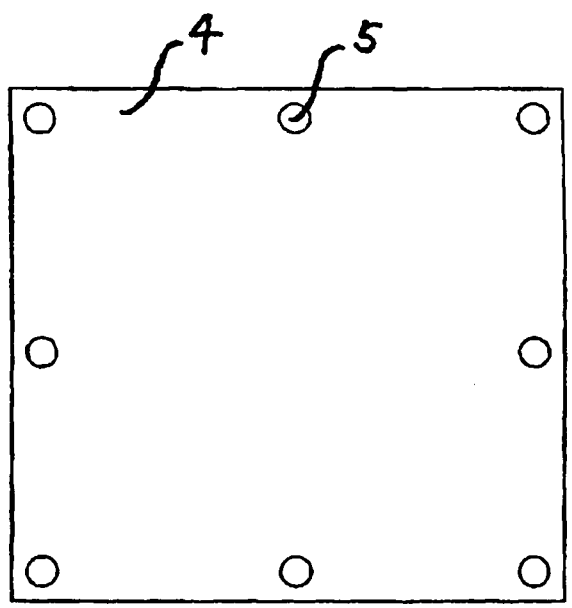
FIG. 2 is a plan view of a gas supply chamber partition plate 4 of the present firing container.

The number, diameter, location, etc. of the gas supply chamber peripheral holes 5 are not particularly limited so long as the above-mentioned function can be obtained. The number and the diameter of the gas supply chamber peripheral holes 5 are preferably determined by the gas flow rate and the difference between the temperature in the furnace and the temperature of the gas when it reaches the gas supply chamber peripheral holes 5, and the faster the gas flow rate, the better. An example of a plan view of the gas supply chamber partition wall 4 is shown in FIG. 2.

The diameter of the gas supply chamber peripheral holes 5 is preferably from 10 to 40 mm, whereby the gas flow rate will be high, and the flow of the gas reaching the lower portion of the container will be strong. The hole diameter is more preferably from 12 to 30 mm, particularly preferably from 15 to 25 mm. It is preferred that the gas chamber peripheral holes 5 are peripherally arranged so that their centers are located within a range of 30 mm from the edge of the partition plate. The number of the gas supply chamber peripheral holes 5 are preferably in a total of from 4 to 16, for example, four i.e. one at each of four corners, or eight i.e. one at each of four corners plus one at a center of each side. The distance between the adjacent gas chamber peripheral holes 5 is not particularly limited, but it is preferably about 20 mm. Further, vent holes may also be formed at the inner peripheral portion of the gas supply partition plate 4 within a range not to impair the above-mentioned function.

Figure 3:
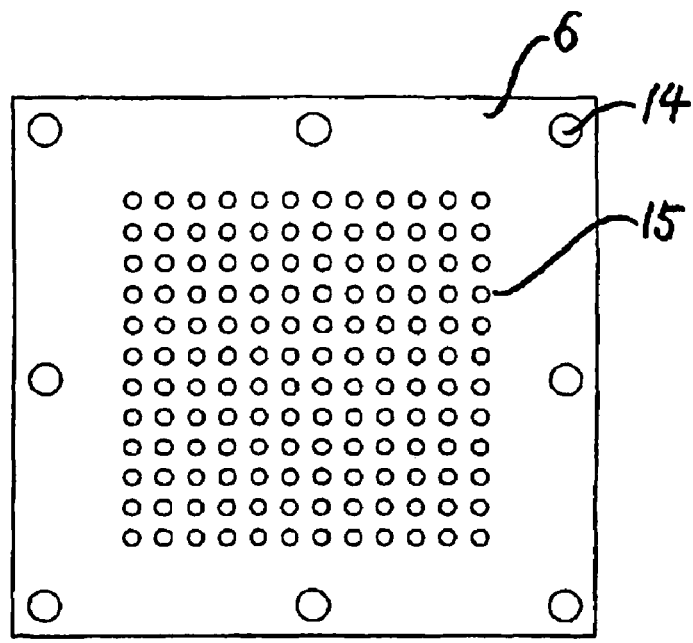
FIG. 3 is a plan view of a firing chamber partition plate 6 of the present firing container.

The firing chamber 3 is a space to accommodate a silicon nitride green body 7, and it is preferred to insert one or two firing chamber partition plates 6 having vent holes (hereinafter referred to as firing chamber peripheral holes) 14 formed in the vicinity of the periphery, whereby convection of the gas from the side surface in the container to the bottom surface in the container will be facilitated. The firing chamber partition plate 6 preferably has vent holes (hereinafter referred to as firing chamber central holes) 15 also at a place other than in the vicinity of the periphery i.e. in addition to the firing chamber peripheral holes 14, whereby the convection of the gas will be facilitated, and the sufficiently preheated gas will be supplied uniformly to the silicon nitride green body. With respect to the firing chamber central holes 15, there is no particular restriction, but the distance is preferably set to be from 5 to 20 mm, and the hole diameter is preferably set to be from 3 to 10 mm. An example of a plan view of the firing chamber partition plate 6 is shown in FIG. 3. As the material for the firing chamber partition plate, it is preferred to use the same material as used for the above-described gas supply chamber partition plate 4.

The firing chamber peripheral holes 14 are preferably formed in the same manner as the gas supply chamber peripheral holes 5, and their positions are preferably such that if the gas supply chamber partition plate 4 and the firing chamber partition plate were superimposed each other, they would be located at the same overlapping positions (hereinafter referred to simply as the same positions), whereby the introduced gas can easily reach the bottom of the firing container, and the convection of the gas will be facilitated.

Further, it is preferred that the gas supply chamber peripheral holes 5 and the firing chamber peripheral holes 14 are connected by connecting pipes, whereby the gas passing through the gas supply chamber peripheral holes 5 will selectively pass through the firing chamber peripheral holes 14, and the convection of the gas will be facilitated. It is preferred that the gas supply chamber peripheral holes 5 and the firing chamber peripheral holes 14 connected by the connecting pipes are vent holes formed at the same positions, whereby the overall construction can be simplified. When they are connected by the connecting pipes, no clearance is preferably formed, but a clearance may be present. Further, it is preferred that the gas supply chamber peripheral holes 5 and the firing chamber peripheral holes 14 are all connected by connecting pipes, but there may be some which are not connected by connecting pipes.

As the material for the connecting pipes, it is preferred to use the same material as used for the above-described gas supply chamber partition plate 4.

Figure 4:
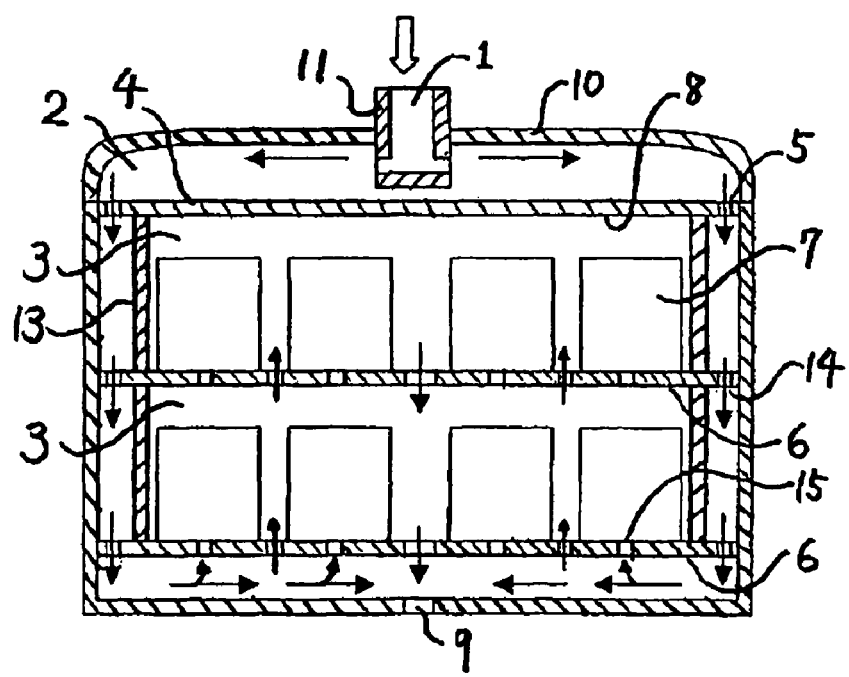
FIG. 4 is a vertical cross-sectional view of another embodiment of the present firing container.

A partition wall 13 may be provided in a space partitioned by the firing chamber partition plate, so that the gas passing through the gas supply chamber peripheral holes 5 will selectively pass through the firing chamber peripheral holes 14 (FIG. 4). In FIG. 4, the partition wall 13 is shown as completely partitioning the space between the partitioning plates, but the upper portion or the lower portion may partially be spaced. For such partial spacing, it is preferred to have the lower portion partially spaced from the viewpoint of the effect for controlling the flow of the gas.

In the firing container 20, a gas outlet 9 is provided. The shape, location, etc. of the gas outlet 9 are not particularly limited. However, it is preferred to provide it at the bottom center portion of the firing container 20, whereby the gas flow will be symmetrical. The gas outlet 9 may be plugged in the same manner as described with respect to the gas inlet 1.

The shape of the firing container 20 is not particularly limited, so long as it is a box type, and a cylindrical shape or an angular columnar type is, for example, a preferred shape. The firing container is preferably constituted by a carbon material and/or a silicon nitride material. It is preferably made of a carbon material, whereby the degree of freedom will be high in shaping into e.g. a complicated shape or a large sized shape, and the preparation will be easy, which is preferred also from the viewpoint of the cost.

Further, as another material, it is preferred to use a silicon carbide material, whereby the heat resistance will be high and the durability will be high with little deformation even by repeated use. As such a silicon carbide material, the above-mentioned crystallized silicon carbide product or sintered product obtained by sintering by means of a sintering aid, using high purity silicon carbide particles as the starting material, may, for example, be mentioned as a preferred one.

The inside of the firing container 20 tends to be brittle due to silicon carbide formed during its use and thus is preferably made of one which is inexpensive and replaceable, from the viewpoint of the control of the atmosphere. More preferably, the present firing container 20 is made to be a double layered or three layered carbon container, whereby the replacement of the inside container is easy, and the structure will be simplified. Particularly preferred is that the present firing container 20 is made to be a double layer carbon container. In a case where the durability is of importance, it is preferred to employ the above-mentioned silicon carbide material for the present firing container 20.

In a case where the present firing container 20 is made to be a double layered carbon container, it is preferred that the carbon of the inside container has a low thermal expansion coefficient, whereby deformation is little, and durability is good. The carbon of the inside container more preferably has a thermal expansion coefficient of from 1.5 to $3.5 \times 10^{-6}/°$ C., particularly preferably from 1.5 to $2.5 \times 10^{-6}/°$ C. A low thermal expansion carbon material is readily available as an extruded material. Further, the inside container may not necessarily be unitary and may be constituted by a combination of plate materials. Further, it is preferred to intimately adhere the inside container and the outside container to prevent SiO or Si vapor from entering, from the viewpoint of the durability of the outside container.

In a case where the present firing container 20 is made to be a double layered carbon container, one directly exposed to the firing atmosphere is the inside container. Accordingly, the carbon of the outside container undergoes no substantial change, and it is preferred to employ one having a high strength and high quality, whereby the durability will be excellent. As a carbon material having a high strength and high quality, a product obtained by cold isostatic pressing (CIP) is preferably employed.

The present firing container 20 is preferably such that the inner surface 8 is constituted by a material containing silicon nitride particles and/or metal silicon particles. As a method for forming such a structure, there may be mentioned a method wherein a slurry containing silicon nitride particles and/or metal particles is coated or sprayed on the surface of a carbon material and/or silicon carbide material to form a coating layer containing silicon nitride particles, or a method wherein a silicon carbide or silicon nitride material is used as it is. In a case where a silicon carbide or silicon nitride material is used as it is, the entire structure may be constituted by the silicon carbide or silicon nitride material, or within a hermetically sealed container of carbon material, a hermetically sealed container with its entirety constituted by the silicon carbide or silicon nitride material may be placed. Otherwise, a part of the silicon carbide or silicon nitride material may be constituted by replacing it with a carbon material prepared by coating or spraying a slurry containing the silicon nitride particles and/or metal particles on the surface, followed by drying.

Further, such a material containing silicon nitride particles will have deposition of silicon carbide particles formed by e.g. the reaction of silicon nitride particles with CO in the atmosphere or the reaction of the carbon container with SiO or Si, on its surface as it is used. In this specification, the material includes one in such a state that a part of the silicon nitride particles or metal silicon particles has been converted to silicon carbide particles.

As a method for heat treating silicon nitride ceramics by e.g. nitriding or firing by means of the present firing container 20, a silicon nitride green body 7 may be placed in the firing chamber 3, and then put into a heat treating furnace, whereupon a predetermined amount of the atmospheric gas is introduced, and the temperature is raised and heat treatment is carried out in accordance with a prescribed temperature program. It is preferred to place the silicon nitride green body 7 on the firing chamber partition plate 6, whereby control of the gas flow will be easy.

In a case where the silicon nitride green body 7 is a silicon nitride honeycomb green body comprising silicon nitride particles and/or metal silicon particles, it is preferred to place the silicon nitride honeycomb green body on the firing chamber partition plate 6. It is further preferred that the silicon nitride honeycomb green body is placed on the firing chamber partition plate 6 via a porous silicon nitride ring-shaped sole plate, whereby non-uniformity in the reaction or sintering can be minimized at the lower surface of the honeycomb green body, and a uniform sintered product can be obtained.

Now, the present invention will be described in further detail with reference to Examples. However, it should be understood that the present invention is by no means restricted to such specific Examples.

EXAMPLE 1 (THE PRESENT INVENTION)

A rectangular columnar firing container having an inside dimension of 850 mm×450 mm and 500 mm in height, was prepared by a plate material prepared by coating and drying a slurry containing silicon nitride particles on the surface of a carbon plate material having a thickness of 15 mm. One firing chamber partition plate 6 having a thickness of 10 mm was set at each of positions of 25 mm and 225 mm in height based on the inside dimension. The firing chamber partition plate 6 was one prepared by coating and drying a slurry containing silicon nitride particles on the surface of a carbon plate material, and a total of 6 vent holes 14 having a diameter of 15 mm i.e. one at each of four corners and one at the center of each side of 850 mm, were formed so that their centers were located at 10 cm from the edge. Further, inside of the vent holes 14, vent holes 15 having a diameter of 5 mm were formed with a pitch of 5 mm.

Further, one gas supply chamber partition plate 4 having a thickness of 10 mm was set at a position of 425 mm in height based on the inside dimension. The gas supply chamber partition plate 4 was one prepared by coating and drying a slurry containing silicon nitride particles on the surface of a carbon plate material, and the vent holes 5 were formed so that they were located at the same positions as the vent holes 14 of the firing chamber partition plate 6.

As a gas inlet 1, a through-hole having a diameter of 40 mm was formed in the vicinity of the center of the upper cover 10, and a pipe 11 was fit in the through-hole to rectify the flow of the gas. Further, as a gas outlet 9, a through-hole having a diameter of 25 mm was formed in the vicinity of the center of the bottom. As a silicon nitride green body to be heat-treated by the present firing container, a honeycomb green body having a diameter of 150 mm, a height of 150 mm, a cell density of 200 cells/2.54$^2$ cm$^2$ and a cell thickness of 0.3 mm was prepared by kneading and extrusion molding a body comprising metal silicon particles, vitreous oxide ceramic particles, an organic binder and deionized water, and the green body was degreased in a degreasing furnace to obtain a test sample body. A total of 16 honeycomb green bodies were placed i.e. eight on the first firing chamber partition plate 6 and eight on the second firing chamber partition plate 6.

The gas inlet of the present firing container was connected to an outside nitrogen supply pipe. This firing container was set in an atmosphere-changeable electric furnace. The atmosphere in the furnace was Ar under a pressure of 0.1 MPa. With respect to the temperature conditions, the temperature was raised from room temperature to 1,200° C. at a rate of 5° C./min and maintained at 1,200° C. for 1 hour, and then introduction of nitrogen gas was initiated. The rate of introduction of nitrogen gas was 90 L/min. In this state, the temperature was raised from 1,200° C. to 1,400° C. at a rate of 1° C./min and maintained at 1,400° C. for 2 hours, and then introduction of nitrogen gas was stopped. Then, the temperature was raised from 1,400 to 1,750° C. at a rate of 3° C./min and maintained at 1,750° C. for 3 hours, whereupon the furnace was cooled.

The obtained silicon nitride honeycomb filter was visually inspected, whereby no cracking was observed on all 16 filters. Further, fluctuation in the porosity measured by Archimedes method was about 10%.

EXAMPLE 2 (THE PRESENT INVENTION)

The operation was carried out in the same manner as in Example 1 except that in Example 1, location of the vent holes 5 and the vent holes 14 was changed so that their centers were located at 15 mm from the edge instead of 10 mm from the edge, and the vent holes 5 and the vent holes 14 which were in the up-and-down relation, and the vent holes 14 and the vent holes 14 which were in the up-and-down relation, were connected by connecting pipes prepared by coating and drying a slurry containing silicon nitride particles on the surface of carbon pipes of 30 mm in outer diameter×20 mm in inner diameter×190 mm in height. The obtained silicon nitride honeycomb filters were visually inspected, whereby no cracking was observed on all 16 filters. Further, fluctuation in the porosity measured by Archimedes method was 8%.

EXAMPLE 3 (THE PRESENT INVENTION)

The operation was carried out in the same manner as in Example 1 except that in Example 1, to the gas supply chamber partition plate and to the bottom side of the firing chamber partition plate located at an upper portion, at a position of 20 mm from the edge of each partition plate, a partition wall 13 prepared by coating and drying a slurry containing silicon nitride particles on the surface of a carbon plate of 5 mm in thickness×142.5 mm in height along the entire peripheral portion, was attached in the form of letter T so that it was spaced by 47.5 mm from the partition plate surface below. The obtained silicon nitride honeycomb filters were visually inspected, whereby no cracking was observed on all 16 filters. Further, fluctuation in the porosity measured by Archimedes method was 5%.

EXAMPLE 4 (COMPARATIVE EXAMPLE)

The operation was carried out in the same manner as in Example 1 except that in Example 1, as the gas supply chamber partition plate 4 and the firing chamber partition plate 6, those having vent holes with a diameter of 5 mm uniformly formed with a pitch of 10 mm over the entirety, were used. Among 16 silicon nitride honeycomb filters obtained, cracks were visually observed on 16 filters. Fluctuation in the porosity was 17%.

According to the present invention, a firing container will be provided which is suitable for heat treatment of a silicon nitride green body. The present firing container is particularly suitable for nitriding treatment of a silicon nitride green body containing metal silicon particles.

The entire disclosure of Japanese Patent Application No. 2003-285226 filed on Aug. 1, 2003 including specification, claims, drawings and summary is incorporated herein by reference in its entirety.

What is claimed is:

1. A firing container for silicon nitride ceramics, which is a hermetically sealed container having a gas inlet and a gas outlet, characterized in that the interior of the hermetically sealed container is partitioned by a gas supply chamber partition plate into a gas supply chamber communicating with the gas inlet, and a firing chamber to accommodate an object to be heat-treated and communicating with the gas outlet, and the gas supply chamber partition plate has vent holes selectively formed in the vicinity of its periphery, wherein the interior of the firing chamber is partitioned by a firing chamber partition plate into two or more compartments, and the firing chamber partition plate has vent holes formed in the vicinity of its periphery.

2. The firing container for silicon nitride ceramics according to claim 1, wherein the vent holes are peripherally arranged so that their centers are located within 30 mm from the edge of the gas supply chamber partition plate.

3. The firing container for silicon nitride ceramics according to claim 1, wherein the vent holes of the gas supply chamber partition plate and the vent holes of the firing chamber partition plate are formed so that they are located at the same overlapping positions when the partition plates are superimposed each other.

4. The firing container for silicon nitride ceramics according to claim 1, wherein the firing chamber partition plate has vent holes formed also at a place other than in the vicinity of its periphery.

5. The firing container for silicon nitride ceramics according to claim 1, wherein the vent holes formed in the vicinity of the periphery of the gas supply chamber partition plate and the vent holes formed in the vicinity of the periphery of the firing chamber partition plate are connected by pipes, so that the gas passing through the vent holes formed in the vicinity of the periphery of the gas supply chamber partition plate will selectively pass through the vent holes formed in the vicinity of the periphery of the firing chamber partition plate.

6. The firing container for silicon nitride ceramics according to claim 1, wherein a partition wall is provided in a space partitioned by the firing chamber partition plate, so that the gas passing through the vent holes formed in the vicinity of the periphery of the gas supply chamber partition plate will selectively pass through the vent holes formed in the vicinity of the periphery of the firing chamber partition plate.

7. The firing container for silicon nitride ceramics according to claim 1, wherein a contour portion of the hermetically sealed container is made of a laminated carbon material.

8. A method for producing a silicon nitride honeycomb filter, which comprises placing a silicon nitride honeycomb green body in the firing chamber of the firing container for silicon nitride ceramics as defined in claim 1 and heat-treating it in a nitrogen atmosphere.

9. The method for producing a silicon nitride honeycomb filter according to claim 8, wherein the silicon nitride honeycomb green body is placed via a porous silicon nitride ring-shaped sole plate.

\* \* \* \* \*